(12) United States Patent
McCullough et al.

(10) Patent No.: US 9,880,576 B2
(45) Date of Patent: Jan. 30, 2018

(54) DIRECT LOAD CONTROL FREQUENCY REGULATION SUPPORT SYSTEM

(71) Applicant: Battelle Memorial Institute, Columbus, OH (US)

(72) Inventors: Jason McCullough, Columbua, OH (US); Eric Rehberg, Westerville, OH (US); Jason W. Black, Dublin, OH (US); James Dvorsky, Plain City, OH (US); Seyed Mansouri, Columbus, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 93 days.

(21) Appl. No.: 14/435,979

(22) PCT Filed: Dec. 6, 2013

(86) PCT No.: PCT/US2013/073621
§ 371 (c)(1),
(2) Date: Apr. 15, 2015

(87) PCT Pub. No.: WO2014/089459
PCT Pub. Date: Jun. 12, 2014

(65) Prior Publication Data
US 2015/0268683 A1    Sep. 24, 2015

Related U.S. Application Data

(60) Provisional application No. 61/734,516, filed on Dec. 7, 2012.

(51) Int. Cl.
*G06F 19/00* (2011.01)
*G05F 1/66* (2006.01)
(Continued)

(52) U.S. Cl.
CPC ............ *G05F 1/66* (2013.01); *G05D 23/1917* (2013.01); *G06Q 30/08* (2013.01); *H02J 3/00* (2013.01);
(Continued)

(58) Field of Classification Search
USPC ......................................... 700/276, 295, 286
See application file for complete search history.

(56) References Cited

U.S. PATENT DOCUMENTS

| 8,145,361 B2 | 3/2012 | Forbes, Jr. et al. |
| 2007/0043478 A1* | 2/2007 | Ehlers ................. F24F 11/0012 700/276 |

(Continued)

OTHER PUBLICATIONS

Kanchev et al, Energy Management and Operaional Planning of a Microgrid with a PV-base Active Generator for Samrt Grid Application, Oct. 2011, IEEE, vol. 58, No. 10, pp. 4583-4592.*

(Continued)

*Primary Examiner* — Kidest Bahta
(74) *Attorney, Agent, or Firm* — Richard M. Klein; Fay Sharpe LLP

(57) ABSTRACT

A plurality of interactive electrical loads defines an aggregation connected with an electrical power grid. A scheduler generates a baseline power consumption schedule for the aggregation, determines frequency regulation capacity of the aggregation, and controls actual power consumption of the aggregation based on the baseline power consumption and an Automated Generation Control (AGC) signal of the electrical power grid to operate the aggregation as an ancillary frequency control device of the electrical power grid with the determined frequency regulation capacity. The controlling may comprise generating baseline dispatch signals for implementing the baseline consumption schedule, adjusting the baseline dispatch signals based on the AGC signal to generate adjusted dispatch signals, transmitting the (Continued)

adjusted dispatch signals to the plurality of interactive electrical loads defining the aggregation, and generating an AGC response log based on differences between the adjusted dispatch signals and the baseline dispatch signals.

18 Claims, 2 Drawing Sheets

(51) Int. Cl.
　　　*H02J 3/00*　　　(2006.01)
　　　*G05D 23/19*　　(2006.01)
　　　*G06Q 30/08*　　(2012.01)
(52) U.S. Cl.
　　　CPC ... *H02J 2003/003* (2013.01); *H02J 2003/007* (2013.01); *Y02E 60/76* (2013.01); *Y04S 10/54* (2013.01); *Y04S 40/22* (2013.01); *Y04S 50/10* (2013.01)

(56) References Cited

U.S. PATENT DOCUMENTS

| | | | |
|---|---|---|---|
| 2008/0177678 A1* | 7/2008 | Di Martini | G01D 4/002 |
| | | | 705/412 |
| 2009/0216387 A1* | 8/2009 | Klein | H02J 3/14 |
| | | | 700/296 |
| 2010/0127452 A1* | 5/2010 | Wentling | A63F 9/1204 |
| | | | 273/157 R |
| 2010/0217550 A1* | 8/2010 | Crabtree | H02J 3/005 |
| | | | 702/62 |
| 2012/0200160 A1 | 8/2012 | Pratt et al. | |
| 2012/0217803 A1 | 8/2012 | Talkin et al. | |

OTHER PUBLICATIONS

International Search Report and Written Opinion for PCT Serial No. PCT/US2013/073621.

\* cited by examiner

DIRECT LOAD CONTROL FREQUENCY REGULATION SUPPORT SYSTEM

This application claims the benefit of U.S. Provisional Application No. 61/734,516 filed Dec. 7, 2012 titled "Auditable Frequency Regulation Support System Utilizing Direct Load Control". U.S. Provisional Application No. 61/734,516 filed Dec. 7, 2012 titled "Auditable Frequency Regulation Support System Utilizing Direct Load Control" is incorporated herein by reference in its entirety.

BACKGROUND

The following relates to the electrical power grid arts, electrical power grid frequency control arts, and related arts.

Electrical power grid management includes maintenance of the target electrical frequency, e.g. at 60 Hz (in North America) or 50 Hz (in Europe). Electrical power generators are designed to operate at (by way of illustrative example) 60 Hz at a given load. If the load increases, this creates counter-torque on the generators which slows the mechanical rotation and consequently lowers the electrical frequency. Conversely, if the load decreases, the counter-torque is reduced, the mechanical rotation speed increases and consequently the electrical frequency increases.

In practice, the electrical frequency is measured in real-time and is used for Automated Generation Control (AGC). The AGC compensates for two error components: (1) a frequency deviation from the target frequency (e.g. about 60 Hz in the U.S., or about 50 Hz in Europe); and (2) the mismatch between scheduled interchanges and actual interchanges. The mismatch information is used to balance out the imports/exports between two systems, e.g. every 10 minutes in some grids, so that one system is not "stealing" power from another. The interchanges are the connection points between any two systems. The AGC may employ throttling of ancillary generators (typically gas-fired for rapid response) up or down. Rather than ancillary generators, energy storage devices such as batteries or flywheels can also be used to absorb or inject power. The ancillary generators (and/or batteries, flywheels, et cetera) are property of the power company and/or property of curtailment service providers (CSPs). In the former case, construction and maintenance of these frequency control devices is a direct cost to the utility company or other grid operator. In the latter case, the grid operator typically contracts with the CSP to obtain access to the regulation resource for a prescribed time interval. In either case, scheduling of sufficient ancillary generator capacity typically done ahead of time, while the AGC is done using the ancillary generators, typically with a response time of minutes to tens of minutes for throttle-up or throttle-down of the ancillary generators.

The requirement to maintain sufficient ancillary generator capacity for Automatic Generation Control introduces substantial overhead cost and energy waste to the power grid. Overhead cost arises due to the need to construct and maintain the ancillary generators, and/or the cost of contracting with CSPs for access to these devices as well as inefficient fuel consumption by throttling generators. These costs can be reduced by improved aggregate load prediction or modeling; however, the grid operator still must plan for unexpected load swings due to weather changes, social events, renewable generation, unexpected industrial loads, and so forth. Energy waste arises due to operational inefficiencies of the ancillary generators (or batteries, flywheels, et cetera).

Automatic Generation Control (AGC) is also sometimes referred to as Secondary Frequency Control. In this context, Primary Frequency Control is provided in the form of frequency response at the load end. Loads providing frequency response are designed to detect the a.c. line frequency and to increase power usage (at least on average) when the frequency goes above the target frequency and to decrease power usage when the frequency goes below the target frequency. Frequency response operates locally to arrest frequency transients, but cannot correct frequency changes produced by such transients. Frequency response also cannot correct imbalances in energy exchanged between systems at interchanges, known as area control error (ACE). On the other hand, Secondary Frequency Control in the form of AGC can both ensure return to the target frequency after a transient and can correct interchange imbalances, i.e. Area Control Error (ACE).

An approach to reduce the need for ancillary generators or the like is Direct Load Control (DLC). In this approach, the grid operator directly controls load operation. By utilizing loads that have an energy storage and/or time lag facet, DLC can in principle provide a mechanism for Secondary Frequency Control. For example, heating, ventilation, and air conditioning (HVAC) systems have high thermal capacity due to the thermal capacity of the heated air volume. Similarly, hot water tanks have thermal capacity in the form of the stored hot water. Using DLC, the grid operator can operate such loads in a manner that provides Secondary Frequency Control while still maintaining the desired room temperature, water temperature, or so forth.

BRIEF SUMMARY

In some illustrative embodiments disclosed as illustrative examples herein, a method comprises: generating a baseline consumption schedule for operating a plurality of interactive electrical loads; transmitting dispatch signals to the interactive electrical loads, the transmitted dispatch signals being dispatch signals of the baseline consumption schedule adjusted based on electronic control signals of an electrical power grid; and generating a response log based on differences between consumption corresponding to the actually transmitted dispatch signals and the baseline consumption schedule. The generating of the baseline consumption schedule, the transmitting, and the generating of the response log are suitably performed by an electronic data processing device.

In some illustrative embodiments disclosed as illustrative examples herein, a system comprises an electronic data processing device configured to transmit dispatch signals to control a plurality of interactive electrical loads, the electronic data processing device configured to interface with an electrical power grid as an ancillary frequency control device providing capacity for frequency control of the electrical power grid.

In some illustrative embodiments disclosed as illustrative examples herein, a non-transitory storage medium stores instructions executable by an electronic data processing device in communication with a plurality of interactive electrical loads defining an aggregation connected with an electrical power grid. The instructions are executable to perform a method comprising: generating a baseline power consumption schedule for the aggregation; determining frequency regulation capacity of the aggregation; and controlling actual power consumption of the aggregation based on the baseline power consumption and electronic control signals received from the electrical power grid to operate the aggregation as an ancillary frequency control device of the electrical power grid with the determined frequency regulation capacity. In some embodiments the controlling comprises: generating baseline dispatch signals for implementing the baseline consumption schedule; adjusting the baseline dispatch signals based on the electronic control signals received from the electrical power grid to generate adjusted dispatch signals; transmitting the adjusted dispatch signals to the plurality of interactive electrical loads defining the aggregation; and generating a response log based on differences between the adjusted dispatch signals and the baseline dispatch signals.

DETAILED DESCRIPTION

Disclosed herein are approaches for leveraging existing loads controlled by interactive load dispatch techniques to perform Secondary Frequency Control with a response time of seconds to tens of minutes, based on the real-time dispatch signal(s). The disclosed approaches are premised on recognition herein of certain difficulties with DLC and other interactive load dispatch approaches for frequency control. One difficulty with employing interactive load dispatch for frequency control is providing for sufficient deployment of loads capable of being controlled by the grid operator. In general, there is no benefit to the end-user in having devices controlled by the grid operator. Indeed, such control could result in increased energy cost to the end-user if such loads are run to reduce the electrical frequency rather than to provide the desired operational effect (e.g., heating water in the case of a hot water tank).

Another difficulty with employing interactive load dispatch for frequency control is its distinctness from existing frequency control methodologies. The existing energy market is designed to provide frequency control devices in-house or to contract for access to such devices. In the case of frequency control by interactive load dispatch, there is no identifiable "device" analogous to an ancillary generator, battery, or flywheel. Rather, interactive load dispatch-based frequency control can only be effective where there is an aggregation or "critical mass" of interactive loads powered by the grid. Thus, interactive load dispatch-based frequency control does not "fit in" to the existing electrical energy marketplace. Attempts have been made to promote interactive load dispatch techniques via regulatory drivers. For example, in the United States, Federal Energy Regulatory Commission (FERC) Order No. 755 mandates that energy markets allow aggregate demand to participate in frequency regulation, and at least one regional transmission organization (PJM, operating in the eastern and midwestern United States) has incorporated aggregate demand into their market. Nonetheless, a non-regulatory approach that integrates effectively into the existing market would be advantageous.

A related difficulty is that interactive load dispatch-based frequency control would appear to require substantial investments in communications and controls to provide a two-way communication system to convey load information to the grid operator or aggregator and to transmit suitable dispatch control signals to the loads, as well as control systems for generating the dispatch signals effective to provide frequency control. While power line communication systems, e.g. broadband over power lines (BPL) communication methodologies, could be used for such communication (or, indeed, cellular networks or the like could also be used), it is not clear how such a complex system could be integrated with the existing frequency controls.

Figure 1:
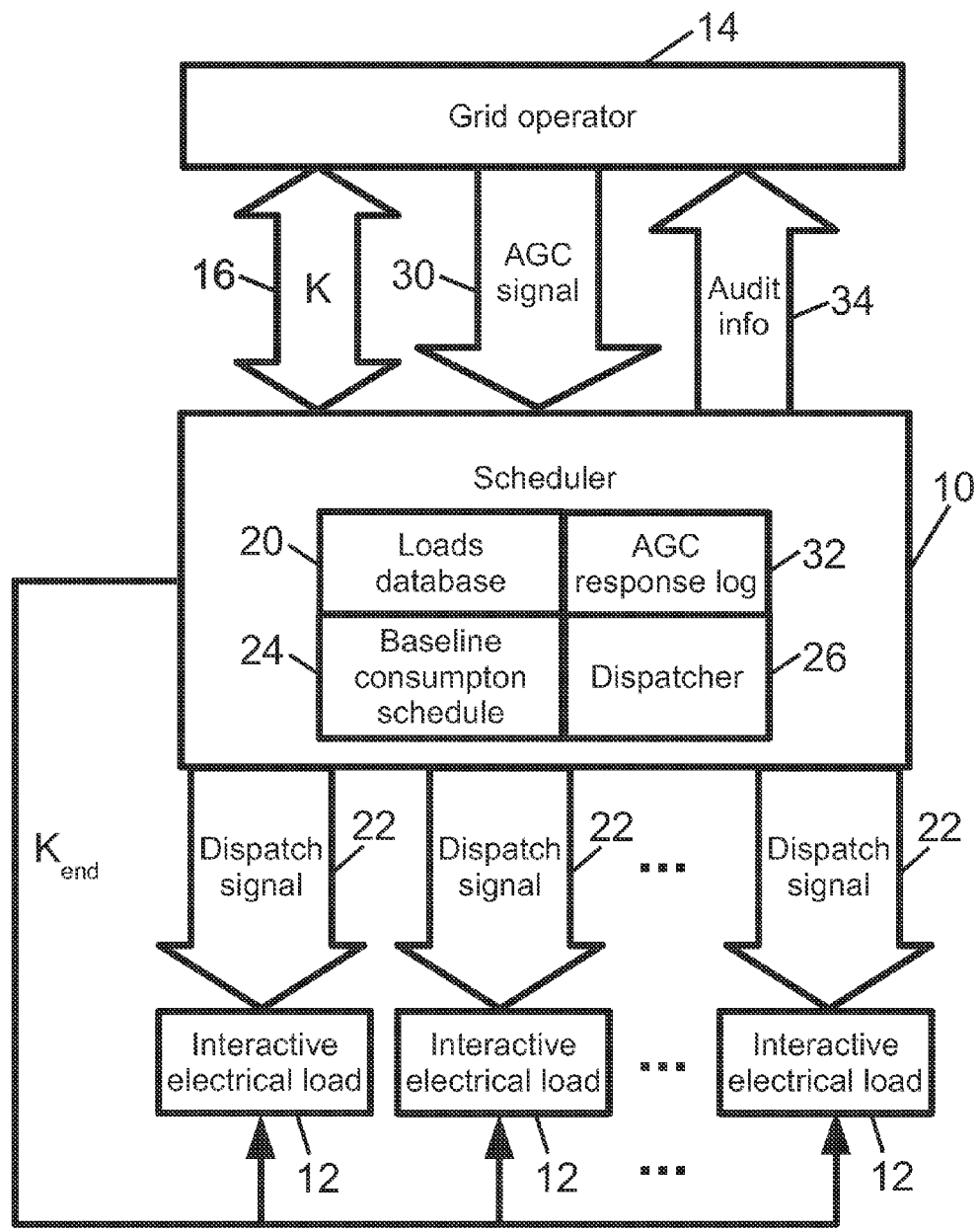
FIG. 1 diagrammatically shows a frequency control system utilizing direct load control.

With reference to FIG. 1, the foregoing difficulties recognized herein are resolved by the following approach. The interactive load dispatch-based frequency control disclosed herein is constructed to mimic an ancillary frequency control device, such as an ancillary generator. Toward this end, a central control entity 10 which is hereinafter referred to as the "Scheduler" 10, controls interactive electrical loads 12. The interactive electrical loads 12 may be residential loads, such as residential hot water heaters, heating ventilation, and air conditioning (HVAC) units, or so forth. Additionally or alternatively, the interactive electrical loads 12 may be commercial loads, such as commercial hot water heaters and/or HVAC units, motor-driven commercial machinery, commercial furnaces, or so forth. The Scheduler 10 may be a unit of the grid operator 14, or may be an autonomous unit, for example a Curtailment Service Provider (CSP) that contracts with the grid operator. In FIG. 1, the relationship between the Scheduler 10 and the grid operator 14 is represented as a contractual ("K") relationship 16. The Scheduler 10 maintains a loads database 20 storing information about the set of interactive electrical loads 12 that are controlled by the Scheduler 10 via dispatch signals 22. The loads database 20 stores pertinent information for each interactive electrical load 12, such as communication addressing information (that is, information sufficient to receive status information from the interactive electrical load and to transmit dispatch signals to the load) and load requirements and capabilities (e.g., maximum energy that can be accepted by the load, default operational requirements, et cetera, such information being available based on the type of load device, operational information provided by the end-user or other device owner, logged operational history of the interactive load, or so forth). The loads database 20 may optionally also store real-time information provided by the load to the Scheduler 10, such as current operating state (on or off), a criticality flag (e.g., if the criticality flag is on then the load must be operated), a hot water tank temperature, and so forth. Based on the information stored in the loads database 20, the Scheduler 10 constructs a baseline consumption schedule 24 for the next time interval.

Along with the baseline consumption schedule 24, the Scheduler 10 determines the frequency regulation capacity available for frequency control, and contracts with the grid operator 14 to make this capacity available to the grid operator for use in Secondary Frequency Control. (Alternatively, if the Scheduler is owned or controlled by the grid operator, then the capacity provided by the Scheduler may be available to the grid operator for frequency control anytime the Scheduler is in operation). The frequency regulation capacity is the range of power deviation from the baseline consumption schedule 24 (in a statistical sense) that can be made over the next time interval. A dispatcher component 26 of the Scheduler 10 operates the interactive loads 12 by sending dispatch signals 22 to the loads to in accordance with the baseline consumption schedule 24. However, if the DLC system is contracted to provide capacity for frequency control (or is otherwise operating to provide excess capacity for frequency control) then the Scheduler 10 receives electronic control signals 30, hereinafter referred to as the Automated Generation Control (AGC) signal 30, from the grid operator 14 (or from the grid itself, e.g. by directly measuring the electrical frequency). Based on the AGC signal 30 received from the grid operator 14, the baseline consumption schedule 24 is adjusted by the Scheduler 10 and the dispatch signals 22 are updated and transmitted to the interactive loads 12 to provide the contracted frequency regulation capacity. In general, this may entail increasing the overall power drawn by the aggregation of interactive loads 12 as compared with the baseline consumption schedule 24 in the event that the AGC signal 30 indicates the grid requires increased load, or decreasing the overall power drawn by the aggregation of interactive loads 12 as compared with the baseline consumption schedule 24 in the event that the AGC signal 30 indicates the grid requires reduced load.

Alternatively, the Scheduler 10 may provide only additional load, that is, may increase the overall power drawn by the aggregation of interactive loads 12 as compared with the baseline consumption schedule 24 in the event that the AGC signal 30 indicates the need for increased load, but does not reduce the overall power drawn responsive to a call for load reduction.

Alternatively, the Scheduler 10 may provide only load reduction, that is, may decrease the overall power drawn by the aggregation of interactive loads 12 as compared with the baseline consumption schedule 24 in the event that the AGC signal 30 indicates the need for reduced load, but does not increase the overall power drawn responsive to a call for increased load.

In the absence of an AGC signal, or if the AGC signal 30 indicates that no load adjustment is needed, the Scheduler 10 outputs the dispatch signals 22 in accordance with the baseline consumption schedule 24. Thus, any difference between the dispatch signals 22 that are actually transmitted to the interactive loads 12 and the dispatch signals indicated by the baseline consumption schedule 24 constitute responses to the AGC 30. This allows the aggregated loads 12 to operate in a manner very similar to a generator providing frequency regulation. Such a generator has a set point, which is adjusted to meet the AGC signal. The baseline consumption schedule 24 of the Scheduler 10 of FIG. 1 corresponds with the generator set point, and the dispatch signal 22 is used to adjust the consumption from the scheduled amount in response to the AGC signal 30. These differences are logged by the Scheduler 10 in an AGC response log 32. Optionally, this logged AGC response information is transmitted to the grid operator as audit information 34 so that the grid operator 14 can confirm that the Scheduler 10 is providing the frequency control capacity called for under the terms of the contract 16. Alternatively, the AGC response log 32 may be maintained at the Scheduler 10 but not transmitted to the grid operator; in this case, the AGC response log 32 is stored and made available to the grid operator, government regulators, or other appropriate parties as appropriate to provide audit information in order to verify operation of the Scheduler 10 as a frequency control device.

In some embodiments, deviation from the baseline consumption schedule 24 may also occur for a particular load if real-time load monitoring dictates such deviation is required by the load. For example, such a deviation might occur if the criticality flag for a load indicates that the load must be powered immediately. (This might occur, for example, if a hot water tank indicates that the stored water temperature has decreased below a minimum threshold. In a similar fashion, a deviation might entail forcing a load off, e.g. if the water temperature is at a maximum threshold). Such load-driven adjustments are not in furtherance of the purpose of frequency control, and hence do not fulfill any obligations to the grid operator in that regard. In such cases, the deviation is logged in the AGC response log 32 in a way that ensures it is evident that the deviation was not made in response to the AGC signal 30. For example, the deviation may be logged along with an indication that the criticality flag was set, and any integrated AGC response metric that may be logged does not include any contribution from this deviation. Additionally or alternatively, the Scheduler 10 can adjust the dispatch signal 22 to substitute other loads, when available, to maintain the baseline consumption as needed. (Put another way, what matters for auditing purposes is the deviation between the actual dispatch 22 for the aggregation of interactive loads 12 versus the baseline dispatch for the aggregation of interactive loads).

In a suitable economic model, the owners of the interactive loads 12 are compensated for allowing these loads to participate in the Secondary Frequency Control. Substantially any compensation mechanism can be employed. In one approach, each load owner contracts with the Scheduler (as indicated by "$K_{end}$" in FIG. 1) or with the entity that owns and operates the Scheduler 10 for a flat-fee rate. In this approach, a flat fee is paid to the load owner on an annual or other time-basis in return for the Scheduler 10 being authorized to control the load for the purpose of frequency control. Thus, the owner of the Scheduler 10 provides the economic incentive to end users to deploy interactive loads that are under control of the Scheduler 10.

The Scheduler 10 is suitably implemented as a computer or other electronic data processing device in operative communication with the interactive loads 12 in order to convey dispatch signals 22 to the loads 12 and, optionally, in order to receive information from the loads 12 (e.g., current water temperature or so forth). The operative communication may be via a wireless network (e.g., cellular telephone network), or via a power line communication (PLC) network, e.g. a broadband over power lines (BPL) network. The functionality of the Scheduler 10 may also be embodied as a non-transitory storage medium storing instructions executable by a computer or other electronic data processing device in operative communication with the interactive loads 12 in order to perform the disclosed frequency control operations.

Advantageously, the disclosed Scheduler 10 appears to the grid operator 14 as simply another frequency control device, analogous to an ancillary generator, battery, or flywheel. Thus, the grid operator 14 can interact with (e.g., contract with and utilize) the Scheduler 10 using existing energy marketplace mechanisms, e.g. soliciting bids to provide frequency control capacity and accepting such a bid from the Scheduler 10, and then conveying the AGC signal 30 to the Scheduler 10 in order to cause it to provide the contracted frequency control capacity.

In view of this, the disclosed frequency control system is highly scalable, and is economically feasible at least on any scale over which an ancillary generator (or system of ancillary generators) is feasible. In particular, this means that the disclosed frequency control system can be deployed with only a few interactive loads, and as additional loads are deployed the capacity of the frequency control system expands accordingly.

Figure 2:
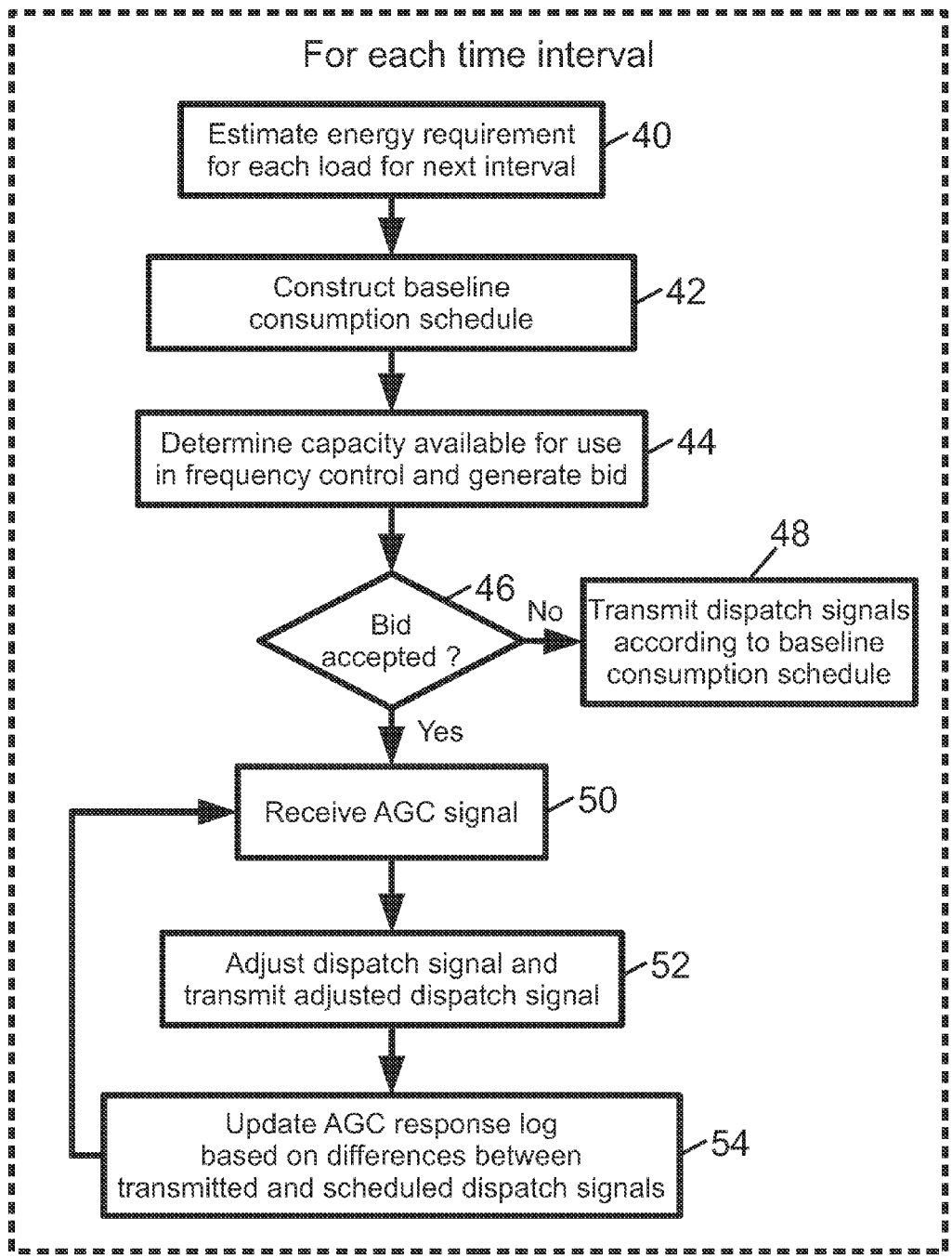
FIG. 2 diagrammatically shows operation of the system of FIG. 1 for one time interval.

With continuing reference to FIG. 1 and with further reference to FIG. 2, operation of the frequency control system of FIG. 1 is described for one time interval. The approach takes advantage of thermal energy storage in the loads 24 such as HVAC and hot water tanks as a buffer to delay consumption activity by at least one time interval. This allows the Scheduler 10 to generate the baseline consumption schedule 24 one time interval in advance. Any deviation from this baseline consumption schedule 24 can then be shown as a response to a control input (e.g. the AGC signal 30), thus providing a basis for auditing. With particular reference to FIG. 2, in a first operation 40, the energy requirement for each load 12 is estimated for the next interval. This can be done on a per-appliance basis, or for an appliance population (e.g., all hot water tanks in the load population). The scheduling algorithm determines an estimate of the appliances' energy requirement for the next time interval in the operation 40. This energy requirement is suitably a function of several factors: (1) the amount of energy currently stored in the appliance population (or associated thermal mass such as the air in a building for HVAC applications); (2) forecast usage within the next interval; and (3) economically motivated pre-consumption. Alternatively, the energy requirement for the upcoming time interval can be specified by the load itself, rather than computed by the Scheduler. From these individual load requirements, an energy requirement value is built for the appliance population as the sum of the energy requirements for the individual loads. Based on the estimated energy requirements for the loads over the next time interval, in an operation 42 the baseline consumption schedule 24 is constructed to operate the interactive loads 12 to achieve these energy requirements. This baseline consumption schedule 24 does not take into account any adjustments based on the AGC signal 30.

The capacity of the load population that is available for use in frequency control is then determined in an operation 44. This is also called the "bid", since it is what is offered to the grid operator 14 (in return for a specified payment or other compensation). Once an energy requirement has been established, the Scheduler 10 estimates how often the appliance population will be called upon to provide regulation above or below its default state during the next time interval. This is referred to herein as the expected dispatch rate ($R_e$). In the case of a market that procures up and down regulation as one service, the expected energy received is the product of the accepted capacity bid, the dispatch rate, and the time interval length. For example in a net zero market the dispatch rate is fixed at 50%. For every megawatt (MW) of regulation capacity provided during an hour, a demand response (DR) operator can expect to absorb 500 kWh (kilowatt-hours) of energy.

In other markets, where separate up and down regulation services exist, this method can be used to verify the performance of load provided up regulation service. The main difference in such a market is that $R_d$ is no longer constant. In this case the energy received is equal to the product of the bid quantity, time interval, and the quantity (1—the dispatch rate), where the sense of dispatch is reversed in this case.

These estimates can be quantified as follows, where the following notation is employed:
  $R_d$=Expected dispatch rate over the next time interval (%)
  Q=Accepted capacity bid (MW)
  t=Interval length (hours)
  $E_r$=Expected amount of energy received (MWh)
  $P_p$=Appliance population's total power capacity (MW)
  $E_p$=Appliance population's total energy capacity (MWh)
  $C_p$=Appliance population's state of charge (%)
Depending on the sense of the dispatch rate there are two equations which could describe the energy received. For cases where an increase in the dispatch rate instructs more consumption:

$$E_r = Q \cdot t \cdot R_d$$

For cases where an increase in the dispatch rate instructs less consumption:

$$E_r = Q \cdot t \cdot (1 - R_d)$$

The estimate also optionally takes into account suitable constraints. Ideally, bid quantity should be chosen so that the energy received by the load population will match the energy requirements determined/estimated in the load energy requirements estimation operation 40 of FIG. 2. Other constraints may limit the quantity of regulation that can actually be provided. One such limiting constraint is that the bid quantity cannot exceed the total power rating of all controlled load minus some margin of safety, i.e. $Q<P_p$. Another limiting constraint arises in a market without a fixed dispatch rate. In this case an unexpectedly down-regulate biased time interval can result in absorbing more power than expected. Some margin of safety should be maintained for this possibility so that appliances are not asked to charge beyond their maximum capacity. To ensure availability in the worst case, the bid quantity should be less than the sum of all controlled appliances' ability to absorb energy over the time interval, i.e. $Q<(E_p \cdot (1-C_r))/t$.

The process described above can be used to generate a bid quantity by solving for Q and applying the constraints. For cases where an increase in the dispatch rate instructs more consumption, the solution is:

$$Q = \frac{E_r}{(t \cdot R_d)} \text{ while } Q < P_p \text{ and } Q < (E_p \cdot (1 - C_p))/t$$

For cases where an increase in the dispatch rate instructs less consumption, the solution is:

$$Q = \frac{E_r}{(t \cdot (1 - R_d))} \text{ while } Q < P_p \text{ and } Q < (E_p \cdot (1 - C_p))/t$$

With continuing reference to FIG. 2, the bid is submitted to the grid operator 14 and the bid is accepted, or not, as indicated by decision block 46. If the bid is not accepted, then in an operation 48 the dispatch signals are transmitted to the interactive loads 12 in accordance with the baseline consumption schedule 24 over the course of the time interval, without any consideration for frequency control. On the other hand, if the bid is accepted for the time interval in the decision block 46, then in an operation 50 the Scheduler 10 receives the AGC signal 30 and in an operation 52 the scheduler 10 adjusts the dispatch signals accordingly to provide frequency control and transmits the adjusted dispatch signals to the interactive loads 12. The AGC response log is updated in an operation 54 based on the difference between the actually transmitted dispatch signals 22 and the scheduled dispatch signals. This difference quantifies the frequency control activity performed by the system under the contract awarded responsive to the bid.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method comprising:
generating, via an electronic data processing device, a baseline consumption schedule for operating a plurality of interactive electrical loads, wherein a load aggregation comprises the electronic data processing device and the plurality of interactive loads connected with an electrical power grid;
transmitting dispatch signals to the interactive electrical loads, the transmitted dispatch signals being dispatch signals of the baseline consumption schedule adjusted based on electronic control signals of the electrical power grid;
generating a response log based on differences between consumption corresponding to the actually transmitted dispatch signals and the baseline consumption schedule;
determining frequency regulation capacity of the load aggregation; and
performing secondary frequency control of the electrical power grid using a plurality of ancillary frequency control devices in accordance with the determined frequency regulation capacity of the load aggregation, wherein the load aggregation is one of the ancillary frequency control devices;
wherein the generating of the baseline consumption schedule, the transmitting, and the generating of the response log are performed by the electronic data processing device.

2. The method of claim 1 further comprising:
after generating the baseline consumption schedule,
submitting a bid to supply the frequency regulation capacity for frequency control.

3. The method of claim 2 wherein the bid is submitted to a grid operator and the method further comprises:
receiving the electronic control signals comprising an AGC signal from the grid operator.

4. The method of claim 1 wherein the plurality of ancillary frequency control devices further includes at least one of ancillary generator, an ancillary battery, and an ancillary flywheel.

5. The method of claim 1 wherein the transmitting comprises:
transmitting the dispatch signals to the interactive electrical loads via a wireless network or a power line communication (PLC) network.

6. A system comprising:
an electronic data processing device configured to transmit dispatch signals to control a plurality of interactive electrical loads, the electronic data processing device configured to interface with an electrical power grid as an ancillary frequency control device providing capacity for frequency control of the electrical power grid, and wherein the electronic data processing device is configured to mimic an ancillary generator providing capacity for secondary frequency control of the electrical power grid.

7. The system of claim 6 further comprising:
said plurality of interactive electrical loads.

8. The system of claim 7 wherein said plurality of interactive electrical loads include residential electrical loads.

9. The system of claim 7 wherein said plurality of interactive electrical loads include hot water heaters.

10. The system of claim 7 wherein said plurality of interactive electrical loads include heating, ventilation, and air conditioning (HVAC) units.

11. The system of claim 6, wherein the electronic data processing device is configured to transmit dispatch signals to control the interactive electrical loads in accordance with a baseline consumption schedule for a time interval adjusted based on an Automated Generation Control (AGC) signal of the electrical power grid.

12. The system of claim 11 wherein the electronic data processing device is further configured to generate auditing information for auditing the capacity provided for frequency control of the electrical power grid based on differences between consumption corresponding to the transmitted dispatch signals and the baseline consumption schedule for the time interval.

13. The system of claim 11 wherein the electronic data processing device is further configured to generate the baseline consumption schedule for an upcoming time interval based on information about the interactive electrical loads.

14. The system of claim 11 wherein the electronic data processing device is further configured to generate the baseline consumption schedule for an upcoming time interval based on energy requirements for the interactive electrical loads reported to the electronic data processing device by the interactive electrical loads.

15. The system of claim 6 wherein the electronic data processing device is further configured to submit a bid to provide capacity for frequency control of the electrical power grid based at least on capacity determined based on a baseline consumption schedule for an upcoming time interval.

16. A non-transitory storage medium storing instructions executable by an electronic data processing device in communication with a plurality of interactive electrical loads defining an aggregation connected with an electrical power grid, wherein the instructions are executable to perform a method comprising:
generating a baseline power consumption schedule for the aggregation;
determining frequency regulation capacity of the aggregation; and
controlling actual power consumption of the aggregation based on the baseline power consumption and electronic control signals received from the electrical power grid to operate the aggregation as an ancillary frequency control device for secondary frequency control of the electrical power grid with the determined frequency regulation capacity.

17. The non-transitory storage medium of claim 16 wherein the method further comprises:
generating a frequency regulation capacity bid based on the determined frequency regulation capacity; and
communicating the frequency regulation capacity bid to an operator of the electrical power grid.

18. The non-transitory storage medium of claim 16 wherein the controlling comprises:
generating baseline dispatch signals for implementing the baseline consumption schedule;
adjusting the baseline dispatch signals based on the electronic control signals received from the electrical power grid to generate adjusted dispatch signals;
transmitting the adjusted dispatch signals to the plurality of interactive electrical loads defining the aggregation; and
generating a response log based on differences between power consumption corresponding to the adjusted dispatch signals and the baseline power consumption schedule.

* * * * *